United States Patent [19]

Linsker

[11] Patent Number: 5,592,529

[45] Date of Patent: Jan. 7, 1997

[54] TELEPHONE INADVERTENT OFF-HOOK CONDITION DETECTOR

[75] Inventor: Ralph Linsker, Millwood, N.Y.

[73] Assignee: International Business Machines Corporation, Armonk, N.Y.

[21] Appl. No.: 314,999

[22] Filed: Sep. 29, 1994

[51] Int. Cl.$^6$ .......................... H04M 1/24; H04M 3/22; H04M 3/00; H04M 1/00

[52] U.S. Cl. .................. 379/32; 379/1; 379/27; 379/28; 379/34; 379/377; 379/381; 379/418; 379/424

[58] Field of Search ................... 379/1, 27, 28, 379/32, 34, 377, 381, 418, 424

[56] References Cited

U.S. PATENT DOCUMENTS

| | | | |
|---|---|---|---|
| 3,038,965 | 4/1962 | Civitano | 379/381 |
| 3,150,237 | 5/1964 | Baldik | 379/381 |
| 4,156,799 | 5/1979 | Cave | 379/266 |
| 4,686,697 | 8/1987 | Shapiro | 379/27 |
| 4,922,529 | 5/1990 | Kiel | 379/424 |
| 4,998,271 | 3/1991 | Tortola et al. | 379/377 |
| 5,142,572 | 8/1992 | Hopkins | 379/377 |
| 5,263,081 | 11/1993 | Nightingale | 379/377 |
| 5,355,407 | 10/1994 | Lazik | 379/381 |
| 5,390,249 | 2/1995 | Park | 379/377 |

*Primary Examiner*—Wellington Chin
*Assistant Examiner*—Vijay Shankar
*Attorney, Agent, or Firm*—Daniel P. Morris

[57] ABSTRACT

An inadvertent-off-hook-condition detecting apparatus for use with a telephone connected to a telephone system is described. The telephone has a hookswitch which connects the voice network of the telephone system across the input lines to the telephone when the hookswitch is in an off-hook position, and which disconnects the voice network from the telephone input lines when the hookswitch is in an on-hook position. The inadvertent-off-hook-condition detecting apparatus has detecting circuit coupled to the telephone for detecting a prespecified signal indicating that the local or remote party wishes to continue the telephone conversation; a timer coupled to the detecting circuit and to the telephone for determining whether the elapsed time since the most recent of the events comprising (1) existence of an on-hook condition and (2) detection of the prespecified signal, is in excess of a prespecified time interval; and an output generator coupled to the timer for producing an output signal indicative of whether the prespecified time interval has been exceeded.

19 Claims, 1 Drawing Sheet

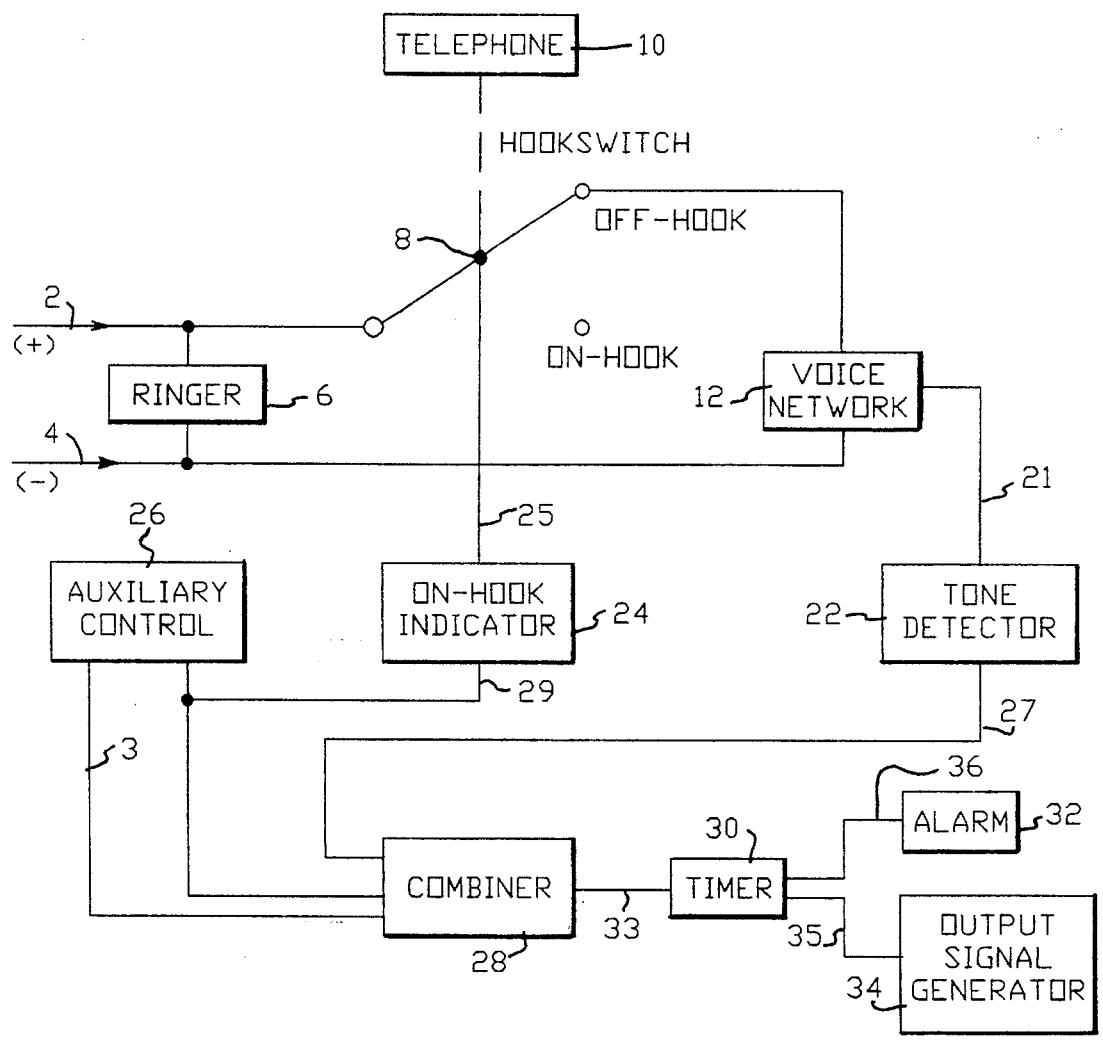

TELEPHONE INADVERTENT OFF-HOOK CONDITION DETECTOR

FIELD OF THE INVENTION

The present invention relates generally to the field of telephones for use in telephone systems, more particularly to ways of preventing the loss of incoming-call service when telephones are inadvertently left off-hook, and most particularly to ways for determining whether a telephone has been inadvertently left off-hook.

BACKGROUND OF THE INVENTION

Present-day telephones must be placed in an on-hook status to receive an incoming call. This means that the telephone line must be disconnected from the voice network of the telephone system in order that an incoming call may activate the ringer circuit. This on-hook status may be provided by physical placement of a telephone handset on a cradle or a specified surface, or by other mechanical or electronic means. A call waiting system can inform the local party that a second remote party is calling. Alternatively, in telephone lines having the call waiting feature, electronic means may be used to detect a second incoming call to the telephone line, and such electronic means may be used to disconnect the local party from the first caller.

If the local telephone user inadvertently neglects to restore the local telephone to on-hook status, various telephone networks supply a distinctive set of tones (the "howler" signal) to alert the user after the phone has remained off-hook without being connected to the voice network for a given period of time. Such a signal is ineffective for alerting the user, however, if the user is not near the telephone or in general does not hear the signal.

U.S. Pat. No. 4,922,529 issued to D. J. Kiel describes an automatic hangup apparatus that comprises inadvertent-off-hook signal detecting means, output signal generator means, and output transducer means for producing one of two sensible response states according to whether an inadvertent-off-hook status is detected. Kiel further describes the case in which the detecting means comprises a howler signal detector. Kiel also mentions the case in which the determination of inadvertent-off-hook status is based on either (1) the existence of a dial tone for an excessive period of time, or (2) the combination of off-hook telephone status with line silence for an excessive period of time, or (3) the combination of off-hook status with motionlessness of the telephone handset.

Some drawbacks of determination methods (1), (2), and (3) are noted by Kiel. An additional drawback of method (2) is that there may be background sound (such as radio, TV, conversation) that prevents the inadvertent-off-hook status from being correctly detected. A drawback of Kiel's howler detection method is that not all telephone networks may provide "howler" signals, and that the particular form of the signals may differ among those telephone networks that do provide such signals. In the latter case the detecting apparatus may need to be configured differently for use on each such network.

One way in principle to overcome the last-stated drawback would be to use automatic means for recording the howler-type signal that is produced by the network on which the telephone is to be used, perform appropriate signal processing on the analog or digital recorded signal, and use the results of such signal processing to determine a set of criteria to be used for detecting the presence of substantially the same signal in the future. This approach may be costly, inconvenient, and prone to error in the processing of signals possibly accompanied by noise or distortions, and it is ineffective when no howler-type signal is provided by the telephone network.

Consequently, it is desirable to provide a means of detecting inadvertent-off-hook status of a telephone without relying on the provision of a howler signal by the telephone network, and without relying on the other methods stated above.

U.S. Pat. No. 4,998,271 issued to Tortola et al also describes detection of a howler signal. U.S. Pat. No. 4,156,799 issued to Cave describes detection of the hangup click of a remote telephone. Other references that relate to the off-hook status of a telephone are U.S. Pat. Nos. 3,038,965 (Civitano), 4,788,712 (Umemoto et al), 5,142,572 (Hopkins), and 3,150,237 (Baldik et al).

OBJECT OF THE INVENTION

An object of the present invention is to provide improved measures to aid in restoring service to a telephone that is in an inadvertent-off-hook condition.

A further object of the present invention is to provide an apparatus that can provide a signal indicating whether a telephone is in an inadvertent-off-hook condition.

A further object of the present invention is to provide such an apparatus in a form that operates independently of whether the telephone network provides any signals indicative of inadvertent-off-hook status.

A further object of the present invention is to provide such an apparatus in a form that is responsive to actions taken by the local or remote parties to a telephone conversation.

A further object of the present invention is to provide such an apparatus in a form that alerts the local and/or remote parties to take action to continue an ongoing conversation.

A further object of the present invention is to provide such an apparatus in a form that can be used either with a conventional dial-tone multifrequency (DTMF) keypad that may be activated by either the local or the remote party, and/or with an auxiliary control that may be activated by the local party.

SUMMARY OF THE INVENTION

A broad aspect of the present invention is an apparatus for use with a telephone connected to a telephone system. The telephone has a hook status selected from a group consisting of on-hook and off-hook. The telephone or the system has a means for a user to generate a reset signal; a detector, having means for coupling to the telephone and for detecting the reset signal; an indicator having means for coupling to the telephone and for producing a hook signal when the hook status is on-hook; a timer, having means for coupling to the telephone. The timer produces a timer signal if and only if said telephone is continuously off-hook for greater than an off-hook time and said reset signal is not detected by said detector within a reset time.

BRIEF DESCRIPTION OF THE DRAWING

Further objects, features, and advantages of the present invention will become apparent from a consideration of the following detailed description of the invention when read in conjunction with the drawing in which:

FIG. 1 is a schematic illustration of the preferred embodiment of the invention.

DETAILED DESCRIPTION

FIG. 1 is a schematic illustration of the inadvertent-off-hook-condition detecting apparatus embodying the concepts of the present invention. A pair of telephone lines 2 and 4 are shown. A ringer 6 is connected across lines 2 and 4. Line 2 continues to hookswitch 8. Hookswitch 8 is switched between off-hook and on-hook positions during normal operation of a telephone 10. When hookswitch 8 is in the off-hook position, the voice network 12 of the telephone system is connected across lines 2 and 4.

In accordance with the present invention, an inadvertent-off-hook-condition detector is provided by a tone detector 22, an on-hook indicator 24, an auxiliary control 26, a combiner 28, a timer 30, an alarm 32, and an output signal generator 34. Tone detector 22 is connected by line 21 to voice network 12 and is adapted to detect a DTMF (dual-tone multifrequency) signal as transmitted by either the local or a remote party over voice network 12. The DTMF signal is the signal which produces the tone heard in the headset of a telephone when a button is pushed on a push button phone. Tone detector 22 produces an output that has an "active" value when a DTMF signal is present. Alternatively, tone detector 22 may be adapted to detect a preselected one or more of the available DTMF signals, that is tone detector 22 responds only when one of a subset of the buttons of a push button phone is pressed. On-hook indicator 24 is connected to hookswitch 8 by line 25 and produces an output that has an "active" value when hookswitch 8 is on-hook. Auxiliary control 26 can be manually actuated, such as by means of a push button by the local party, and produces an output that has an "active" value when it is being actuated. The auxiliary control 26 provides a manual means for the local party to restart the timer indicating that the telephone is currently in active use. The auxiliary control 26 can be a push button attached to the phone. Combiner 28 is connected to, and receives inputs from, tone detector 22, on-hook indicator 24, and auxiliary control 26 by lines 27, 29 and 31, respectively, and produces an output that has an "active" value when any one or more of these inputs is currently active. Timer 30 is connected to, and receives input from, combiner 28 through line 33. Timer 30 measures the elapsed time since the value of its input was last "active." When this elapsed time exceeds a prespecified time interval (denoted T0), a first output from timer 30 has an "active" value. For example, the timer sends out a signal which causes an audible signal, such as in the headset which can be heard by both the local and remote party which prompts the local party to activate the auxiliary control and/or the local and/or remote party to press one of the touch tone buttons on the telephone to reset the clock. Alternatively, the audible signal can be an alarm which is loud enough to be heard by both the local and remote parties. If either the local or remote party does not provide an input to reset the clock, the timer can be chosen to provide a grace period at the end of which another signal is given in response to which the local or remote party can provide a signal to maintain the connection between the parties. There can be more than one grace period. When the elapsed time exceeds each of one or more prespecified time intervals (denoted T1, ... Tn), a second output from timer 30 has an "active" value, for example, an audio or visual signal. Output signal generator 34 is connected to timer 30 by line 35, and produces an output signal indicative of an inadvertent-off-hook condition when the first output of timer 30 is active. This signal can be used to put the phone in an on-hook condition using, for example, an apparatus described in Kiel. Alarm 32 is connected to timer 30 by line 36, and produces a sensible signal to alert the local and/or the remote party that a prespecified time interval has elapsed, when the second output of timer 30 is active. The duration of time interval T0 generally exceeds the time intervals T1, ... Tn.

Tone detector 22 may be realized using the Silicon Systems SSI 75T201 Integrated DTMF Receiver. Timer 30 may be realized using the National Semiconductor LM555/LM555C Timer, or the LM556/LM556C Dual Timer.

In an alternative embodiment, alarm 32 is absent and the second output of timer 30 is absent or unused.

In another alternative embodiment, auxiliary control 26 is absent.

While the present invention has been described with respect to preferred embodiments, numerous modifications, changes, and improvements will occur to those skilled in the art without departing from the spirit and scope of the invention.

I claim:

1. An apparatus for use with a telephone connected to a telephone system, said telephone of said telephone system having means for a user to generate a user generated reset signal, comprising:

said telephone having a hook status selected from a group consisting of on-hook and off-hook, a detector, having means for coupling to said telephone, for detecting said user generated reset signal;

an indicator of said hook status having means for coupling to said telephone, for producing a hook signal;

a timer, having means for coupling to said telephone, said timer producing a timer signal if and only if said telephone is continuously off-hook for greater than an off-hook time and said user generated reset signal is not detected by said detector within a reset time;

an output signal generator coupled to said timer for producing an output signal;

an auxiliary control for providing said user generated reset signal;

an alarm coupled to said timer;

if said telephone is continuously off hook for greater than said off-hook time and said reset signal is not received within said reset time said telephone is determined to be inadvertently off-hook;

a re-hook means to place said telephone in an on-hook status;

an alert means coupled to said timer for generating an alert signal and wherein if said timer produces said timer signal, said alert means generates an alert signal;

combining means coupled to said detector, said indicator and said timer.

2. An apparatus according to claim 1 wherein said reset signal is a tone signal.

3. An apparatus according to claim 1, wherein said reset signal is a DTMF signal.

4. An apparatus according to claim 1, wherein said reset signal can be produced by another telephone connected to said telephone system.

5. An apparatus according to claim 1 wherein said telephone system includes a voice network coupled to said detector.

6. An apparatus according to claim 1 wherein said telephone includes a hook switch coupled to said indicator.

7. An apparatus according to claim 1 wherein said re-hook means is coupled to said output signal generator.

8. An apparatus according to claim 1 wherein said alert signal is an audible sound.

9. An apparatus according to claim 1 wherein said user is selected from the group consisting of a user of said telephone, and a user of another telephone coupled to said telephone system and in telephonic communication with said telephone.

10. An apparatus according to claim I wherein said off-hook time is equal to said reset time.

11. A telephone for connection to a telephone system, said telephone having a hook status selected from a group consisting of on-hook and off-hook, said telephone or said telephone system having a means for generating a user generated reset signal comprising:

a detector for detecting said reset signal;

an indicator of said hook status for producing a hook signal;

a timer for producing a timer signal if and only if said telephone is continuously off-hook for greater than an off-hook time and said reset signal is not detected by said detector within a user generated reset time;

an output signal generator coupled to said timer for producing an output signal;

an alarm coupled to said timer;

an auxiliary control for providing a user generated reset signal;

an alert means coupled to said timer for generating an alert signal and wherein if said timer produces said timer signal, said alert means generates an alert signal; and a combining means coupled to said detector, said indicator and said timer; and if said telephone is continuously off-hook for greater than said off-hook time and said reset signal is not received within said user generated reset time said telephone is determined to be inadvertently off-hook;

further including a re-hook means to place said telephone in an on-hook status; and said re-hook means is coupled to said output signal generator.

12. A telephone according to claim 11, wherein said reset signal is a tone signal.

13. A telephone according to claim 11, wherein said reset signal is a DTMF signal.

14. A telephone according to claim 11, wherein said reset signal can be produced by another telephone connected to said telephone system.

15. A telephone according to claim 11 wherein said telephone system includes a voice network coupled to said detector.

16. A telephone according to claim 11 wherein said telephone includes a hook switch coupled to said indicator.

17. A telephone according to claim 11 wherein said alert signal is an audible sound.

18. A telephone according to claim 11 wherein said user is selected from the group consisting of a user of said telephone and a user of another telephone coupled to said telephone system and in telephonic communication with said telephone.

19. A telephone according to claim 11 wherein said off-hook time is equal to said reset time.

* * * * *